(12) United States Patent
Davis et al.

(10) Patent No.: US 7,853,473 B2
(45) Date of Patent: Dec. 14, 2010

(54) MARKET-BASED PRICE OPTIMIZATION SYSTEM

(75) Inventors: Scott M. Davis, Sacramento, CA (US); Gary L. Huckabay, Concord, CA (US); Jeffrey S. Smith, Sacramento, CA (US)

(73) Assignee: Revionics, Inc., Roseville, CA (US)

( * ) Notice: Subject to any disclaimer, the term of this patent is extended or adjusted under 35 U.S.C. 154(b) by 1133 days.

(21) Appl. No.: 10/931,882

(22) Filed: Aug. 31, 2004

(65) Prior Publication Data

US 2006/0047608 A1 Mar. 2, 2006

(51) Int. Cl.
*G06Q 99/00* (2006.01)
(52) U.S. Cl. ............... 705/10; 705/1.1; 705/35; 705/400
(58) Field of Classification Search .......... 705/10, 705/26, 35, 400, 1, 7, 1.1
See application file for complete search history.

(56) References Cited

U.S. PATENT DOCUMENTS

| | | | |
|---|---|---|---|
| 5,822,736 A * | 10/1998 | Hartman et al. ............. 705/1 |
| 5,844,817 A | 12/1998 | Lobley et al. |
| 5,873,069 A | 2/1999 | Reuhl et al. |
| 5,953,707 A | 9/1999 | Huang et al. |
| 5,987,425 A | 11/1999 | Hartman et al. |
| 6,125,355 A | 9/2000 | Bekaert et al. |
| 6,151,565 A | 11/2000 | Lobley et al. |
| 6,553,352 B2 | 4/2003 | Delurgio et al. |
| 6,609,109 B1 | 8/2003 | Bradley et al. |
| 7,062,447 B1 | 6/2006 | Valentine et al. |
| 7,072,848 B2 * | 7/2006 | Boyd et al. ................. 705/10 |
| 7,124,116 B2 * | 10/2006 | Huyler ...................... 705/400 |
| 7,133,848 B2 | 11/2006 | Phillips et al. |
| 7,257,561 B1 * | 8/2007 | Abe .......................... 705/400 |
| 7,302,410 B1 * | 11/2007 | Venkatraman et al. ........ 705/35 |
| 7,523,047 B1 | 4/2009 | Neal et al. |
| 2001/0051932 A1 | 12/2001 | Srinivasan et al. |
| 2002/0004789 A1 | 1/2002 | Huyler |
| 2002/0035537 A1 * | 3/2002 | Waller et al. ............... 705/37 |
| 2002/0107818 A1 | 8/2002 | McEwen et al. |
| 2002/0116348 A1 | 8/2002 | Phillips et al. |
| 2002/0123930 A1 | 9/2002 | Boyd et al. |

(Continued)

OTHER PUBLICATIONS

RivalWatch Compilation of Screenshots for 2000-2003.*

(Continued)

*Primary Examiner*—John W Hayes
*Assistant Examiner*—Freda A Nelson
(74) *Attorney, Agent, or Firm*—Schwegman, Lundberg & Woessner, P.A.

(57) ABSTRACT

A market-based software system that will help user-retailers manage price and inventories more effectively. The system will take advantage of available price and sales data to provide pricing recommendations that will achieve a retail user's objectives. The system will offer a solution that will allow for pricing improvement shortly after installation by utilizing data that is readily available. The system will recommend price changes that help a user achieve specified objectives such as contribution, sales volume, desired margins, and the like. The system can also collect and process price and sales data on an ongoing basis, which can enable improved estimates of customer price sensitivity and performance on a category-by-category basis. This data can be used to improve further pricing decisions.

4 Claims, 6 Drawing Sheets

U.S. PATENT DOCUMENTS

| | | | |
|---|---|---|---|
| 2002/0161686 | A1 | 10/2002 | Stover et al. |
| 2003/0023567 | A1 | 1/2003 | Berkovitz et al. |
| 2003/0093313 | A1 | 5/2003 | Kiefer |
| 2003/0101146 | A1 | 5/2003 | Yeo et al. |
| 2003/0126097 | A1 | 7/2003 | Zhang et al. |
| 2003/0149578 | A1 | 8/2003 | Wong |
| 2003/0195791 | A1* | 10/2003 | Waller et al. ............... 705/10 |
| 2003/0217016 | A1 | 11/2003 | Pericle |
| 2004/0049470 | A1 | 3/2004 | Ouimet |
| 2004/0172372 | A1* | 9/2004 | Wells et al. ............... 705/400 |
| 2004/0210542 | A1 | 10/2004 | Sweeney |
| 2008/0201271 | A1 | 8/2008 | Davis et al. |
| 2008/0201272 | A1 | 8/2008 | Davis et al. |
| 2008/0201273 | A1 | 8/2008 | Davis et al. |

OTHER PUBLICATIONS

RivalWatch Screenshots 2000-2001, pp. 1-68 (68 pgs).*

RivalWatch Screenshots 2002-2003, pp. 69-82 (14 pgs).*

Pauwels et al., "The long-Term Effects of Price Promotions on Category Incidence, Brand Choice, and Purchase Quantity", Nov. 2002, Journel of Marketing research, vol. XXXIX, 421-439. (19 pgs).*

"U.S. Appl. No. 12/014,626, Non Final Office Action mailed Oct. 7, 2009", 17 pgs.

"U.S. Appl. No. 12/014,626, Preliminary Amendment filed Jan. 15, 2008", 5 pgs.

"U.S. Appl. No. 12/014,626, Response filed Apr. 7, 2010 to Non Final Office Action mailed Oct. 7, 2009", 11 pgs.

Aalto-Setala, V., et al., "Attractive prices in grocery and automobile markets—why is such pricing used?", *Journal of Retailing and Consumer Services*, 11(5), (Sep. 2004), 299-306.

Anderson, E. T, et al., "Effects of $9 Price Endings on Retail Sales: Evidence from Field Experiments", *Quantitative Marketing and Economics*, 1 (1), Mar. 2003), 93-100.

Bergen, M., et al., "Shattering the Myth of Costless Price Changes", *European Management Journal*, 21(6), (Dec. 2003), 663-669.

Estelami, Hooman, "The effect of price presentation tactics on consumer evaluation effort of multi-dimensional prices", *Journal of Marketing Theory and Practice*, 11(2), (2003), 1-15.

Green, Donna, "Smart Pricing key to Small Business Strategy; Sometimes it's Wise to Favour the High Side", *1 Edition*, (Oct. 11, 1999), 3 pgs.

McPartlin, John, "The Price You Pay", CFO.com, (Mar. 15, 2004), 4 pgs.

Naipaul, et al., "Menu Price Endings That Communicate Value and Quality", *Cornell Hotel and Restaurant Administration Quarterly*, (Feb. 2001), 12 pgs.

Simmons, et al., "Cultural Superstitions and the price Endings Used in Chinese Advertising", (June 2002), 101-111.

Stiving, Mark, "An Emperical Analysis with Price Endings with Scanner Data", *Journal of Consumer Research*, vol. 24, (Jun. 1997), 57-67.

Green, Donna, "Smart Pricing key to Small Business Strategy; Sometimes it's Wise to Favour the High Side", *1 Edition*, (Oct. 11, 1999), 2 pgs.

\* cited by examiner

Product Detail

Product Detail
- UPC Code: 019014111108
- Size: 8 LB
- Avg Weekly Units: 3.17
- Description: IAMS DOG FOOD-MINI CHUNKS
- Margin: 0.38
- Cost: $6.66
- Cur Price: $10.69
- Sug'd Price: $10.49

Price Lock: Update / Reset

Promo Sched | Price Family | Private Label Gap | Price Per Unit | Weekly Units | Target Prices

| | OR | VA | CP | MA | PPU | PLG | EN |
|---|---|---|---|---|---|---|---|
| 1 | 10.69 | 9.94 | 10.50 | 10.69 | 10.69 | | 10.49 |

OR = Original Price
VA = Volume-Margin/Promo-Freq Target Price
CP = Competitor-Analysis Target Price
MA = Margin-Analysis Target Price
PPU = Price-Per-Unit/Brand-Equity Target Price
PLG = Private Label Group Target Price
EN = Ending Number Target Price Close

Fig. 5

MARKET-BASED PRICE OPTIMIZATION SYSTEM

RELATED APPLICATION

This application is related to U.S. application Ser. No. 12/014,626, entitled "Price Optimization System for Recommending Product Price Changes to a User Based on Analytic Modules Calculating Price Recommendations Independently" filed Jan. 15, 2008, U.S. application Ser. No. 12/014,640 (abandoned), entitled "Price Optimization System And Process For Recommending Product Price Changes To A User Based On Numerical Endings Of Prices" filed Jan. 15, 2008, and U.S. application Ser. No. 12/014,606 (abandoned), entitled "Price Optimization System And Process For Recommending Product Price Changes To A User Based On Unit Size, Price And Margin" filed Jan. 15, 2008.

SUMMARY

Disclosed is a market-based price optimization system. To effectively price any given item, analysts should consider a large number of factors. Prices should be set consistently across multiple products offered by the same manufacturer. This requires accounting for price-per-unit ratios across sizes and product families that must be priced identically. Prices across brands should account for the relative perceived value of the various brands. The gap between the price of a private label product and the corresponding nationally branded product should account for these customer perceptions. The intent to promote a product should also influence its price; that price will influence the customer's perceived value of the promotion, and the depth of a price promotion required to obtain the desired effect. Minor changes in price numerical endings may have little impact on price perceptions but may have a significant impact on the bottom line. Each of these factors individually makes effective pricing complicated and difficult. When taken together, they present a challenge that tier-2 retailers (those with under $1 Billion in annual sales) are not currently equipped to overcome.

Cross-category prices should also be consistent with a retailer's overall performance objectives. Many retailers believe consumers look at the prices of a set of items and form a "price image" for a category and the store as a whole. Category pricing policies should consider the role of the category in generating store traffic, stimulating discretionary purchases within and across categories, and whether or not the customer is even aware of price differences among competing stores. The target price image for any given category may be higher or lower than others, depending on the strategy of the retailer. For example, if a retailer is in a demographic area where there are many mothers, they may want to drive traffic by having a low price image in the baby category, but drive profits by having higher prices in the candy category. The system allows the user-retailer to tailor the pricing policies down to the sub-category level to address their individual pricing strategies.

The system will also collect and process price and sales data on an ongoing basis, which can enable improved estimates of customer price sensitivity and performance on a category by category basis. This data will be used to improve further pricing and inventory management decisions.

BRIEF DESCRIPTION OF THE DRAWINGS

FIG. 5 is an illustration of a Product Detail Screen useful in the system.

GENERAL DESCRIPTION

Figure 1:
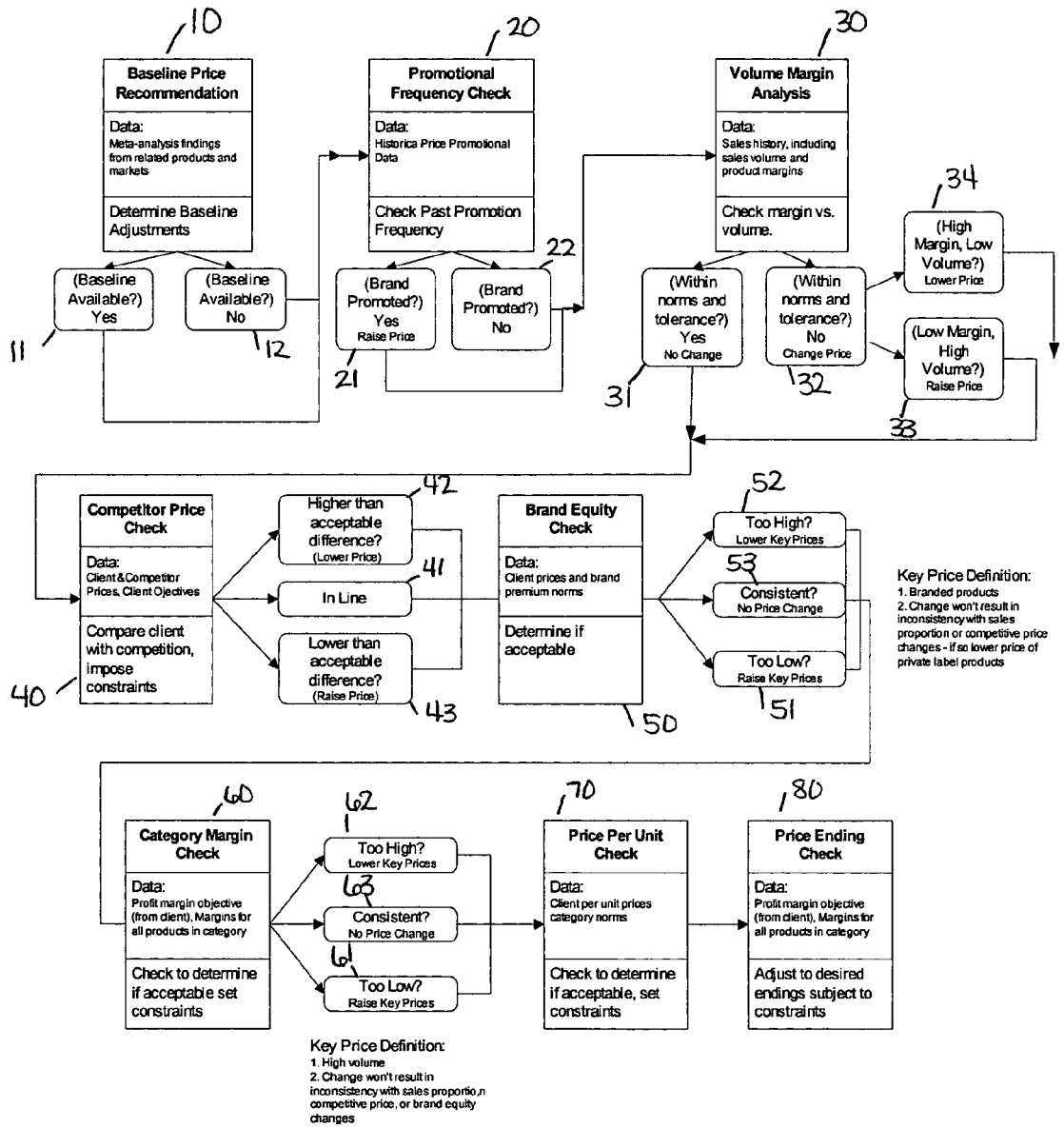
FIG. 1 is a flow chart showing the overall process flow of the market based price optimization system.

The system is referred to as Market-Based Price Optimization System (MBOS) and has as characteristics the fact that it can:

be designed for rapid installation and pricing recommendations;

utilize cost, promotional patterns, retail standard brand price premium, and competitive price information to identify potential candidates for price change;

integrate the foregoing market data with retail user objectives to suggest price changes that are likely to increase performance relative to user objectives and subject to user constraints;

monitor response to price changes and revise optimization methodology based on that response; and monitor market changes and suggests price responses.

The system uses analytic modules described in more detail subsequently. These analytics modules can be implemented in software using the teachings of this written description. The system can recommend a set of initial price changes using limited historical sales data. The price changes generated by this process can generate variability in prices of non-promoted products, which can, in turn, be used to estimate price sensitivity and improve price change recommendations generated by the Market-Based Price Optimization System. "Market Based" refers to a pricing system that uses elasticity or change in sales volume as a result of price, as well as product attributes, to recommend price changes.

The first three steps of the analysis to recommend price changes, seen below, can be conducted on a bi-monthly basis. This frequency will make it possible to statistically estimate the impacts of the price changes on sales volume, which will yield measures of price sensitivity. Other periods besides bimonthly can be used. It is possible to use weekly, monthly, or periods of variable lengths in the estimation of the impact of price changes if necessary or desired.

1. Price-Sensitivity Baseline Analysis. The first step in the process is to determine if any price-sensitivity baselines exist and, if so, implement price changes that incorporate these baselines. As used in this context, "price-sensitivity baselines" means established patterns of change in quantity sold as a result of a change in a product's regular price. These baselines will usually not exist when entering a new retail market. However, as data are collected in a market, meta-analyses will be conducted that will suggest price variations based on knowledge generated from historical data and results from other retailers to generate price recommendations. As used in this context, "meta-analyses" means an analysis of data from inside and outside the individual user-retailer, but from the same market. Over time price and sales data will be analyzed to develop estimates of demand and local price sensitivity. These estimates will be utilized to recommend price changes that are likely to increase profits. For new product categories or markets, this step can be bypassed if desired.

2. Price-Promotion Analysis. In the absence of findings from meta-analyses or a Market-Based Price Optimization System, which absence indicates that there is not sufficient data in the sales history to determine a demand function for a product, a check is done to determine whether a brand has been frequently price-promoted in the past. If a brand has been frequently price-promoted in the past, the marketing literature suggests the regular price of the product should be increased. Raising the price of heavily promoted products will allow greater margins from a given price discount or a greater perceived discount with the same post-promotion price.

3. Volume-Margin Analysis. For products that are not heavily promoted, identify, possible outlier products based on deviations of a user's sales from market norms. As used in this context, "outlier products" means products with extremely high or extremely low sales volumes. Outliers form the area around the mean for a subcategory of products. Adjustments based on this step can be bypassed when there is ample historical data to derive local demand estimates, although the loss from this analysis will still contribute to the system loss. As used in this context, "loss" means disutility for the final recommended price based on its distance from the recommended price by this particular function. Adjustments can be as follows:

(a) If the user's sales for a high margin product in a subcategory are very low, a price reduction is recommended to increase sales and profitability.

(b) If the user's sales of a low margin product in a subcategory are very high, a price increase is recommended to stimulate a shift in sales to more profitable products, thereby increasing category profitability.

(c) The price changes can be a percentage based on a parameter that is input into the system and may vary based on product category and user objectives. For example, users may define parameters like "default amount" to change price using a given analytics module and/or within a subcategory e.g. five percent (5%) of diapers using the Competitor Price Module (which module is described subsequently in FIG. 1). The parameter value may be refined over time based on category experience.

(d) A loss function can be associated with deviations from proposed changes.

The remaining steps in the process will be implemented, for example, on a monthly monitoring basis or when there is a change in market conditions, such as a change in unit wholesale price or competitive price changes, as follows.

4. Competitor Price Analysis. This step is the first step in the monthly monitoring process. It compares the prices (incorporating proposed price changes from steps 1-3, above) to the prices charged by competing retailers. Competitor prices are provided by the user, who can get them from their own competitive shop, through a wholesaler, through purchasing them from a third party, or through other appropriate means.

(a) Ideal prices relative to competitors can be obtained from the user based on specified objectives and retail strategy. Examples of objectives may be a specified percentage of a competitor's price or being within an acceptable percentage range relative to one or more competitors. These criteria may vary across categories.

(b) A loss function will be attached to deviations in prices from competitors accounting for the desired criteria.

(c) Price recommendations will be adjusted to minimize the total loss from the Baseline Price Recommendation and Sales Promotion Check (also know as the Promotional Frequency) modules. The end price reduction is adjusted to minimize the sum of loss from all analytics modules.

5. Brand Equity Analysis. The next step determines whether the proposed prices of various brands are within acceptable ranges relative to a reference brand. This ratio will reflect the price differential or brand equity each brand commands in the competitive retail market place. When the reference brand is a private label brand then this differential may be viewed as "the private label gap."

(a) Prices for different brands will be collected from representative competitors. Price per unit values will be calculated for each brand and the ratio of the average price per unit of the chosen brand to the price per unit of the reference brand will be computed. The reference brand for a subcategory is determined by sales volume—the reference brand is the best selling national or regional brand.

(b) A loss function will be attached to deviations in price ratios from the competitive norms.

(c) Price recommendations will be adjusted to minimize the total loss from the first three steps.

6. Category Margin Analysis. The third step in the ongoing monthly process will compare the projected average margin from the category with objectives set by the retail user.

(a) Initially utilizing current quantities sold, an estimated average category margin will be calculated.

(b) A loss function will be assigned to average category margins that fall short of the target value, set by the user.

(c) Price recommendations will be adjusted to minimize the total loss from the first four steps above 7. Price Per Unit Analysis. The fourth step in the monthly process will consider the consistency of price per unit and markup per unit relationships. It is expected that a product's price per unit should be lower as the number of units (size) increases.

A typical average relationship between unit size and both price and margin per unit will be calculated using regression across brands. For example, for cola, the expected price per ounce of a cola could be: 0.013+0.0125*Coke+ 0.0092*Pepsi. Other brands will have different coefficients, based on historical sales data. This module calculates a recommended price for a product based on a regression model that regresses sales volume against price per unit and brand. The general form of the legit model is as follows, for the hypothetical Subcategory of fresh water fish, with the brands catfish, trout, and bass:

Volume (total units)=Intercept+Price Weight+Flag (catfish)(Brand Weight)+Flag(trout) (Brand Weight)+Flag(bass)(Brand Weight)

Where

Intercept is the constant from the regression; the baseline of expected sales without taking any product attributes into consideration whatsoever.

Flag indicates whether the fish in question is of the subtype in question; if the fish to be priced is a catfish, the catfish flag is set to 1, and all other flags indicating specific variety of fish are set to zero, and Brand weight means the comparative importance of the specific brand. For example, catfish might have a weight of 0.5, where trout might be more desirable to the public (based on historical sales data), and might have a weight of 0.7. The result is that for each type of fish in the example, there is a compound weight of (flag×brand weight). If a fish is not of a particular type, the flag is zero, and the compound weight for that fish type is zero—because it's not that specific type of fish.

The software loops through every brand in the subcategory, setting the appropriate flag to one, and all others to zero, depending on the brand, to determine the individual weight of each brand.

With brand weights established for each brand, expected price per unit is multiplied by the size of each unit, then discounted 3%+2% beyond the first increment for each size up from the smallest for each size, to ensure consistent reduction in price per unit as size increases. The percentages refer to the drop in Price Per Unit for each size. For example, consider Heinz Ketchup with four sizes: 14 oz., 24 oz., 36 oz., 48 oz. The 14 oz. is $1.39, or $0.10/oz. The first increment increase, from 14→24 oz, should have a 3% decrease in price per unit, or should be no more than $0.097 per oz. The next jump, from 24→36 oz., should have a further 2% decrease, as should the jump from 36→48 oz. The first drop is 3%, each subsequent drop is 2%.

Price recommendations will be adjusted to minimize the total loss from the Price Recommendation, Sales Promotion, Competitor Price, Volume Margin and Category Margin modules, each described with respect to FIG. 1.

8. Price Ending Analysis. The next step in the monthly process will examine the numerical endings of the price recommendations and suggest price adjustments that have acceptable price endings.

(a) A loss function will be associated with price endings. For example, no loss will be associated with a price that ends with a 9 and a large loss will be associated with a price that ends with 1. The loss function should account for at least two significant digits. For example a price that ends with 0.05 has a high loss while a price that ends with 0.095 will have a substantially lower loss. Available evidence from peer-reviewed research indicates that consumers process pricing information from left to right. That is, consumers see the price difference between $19.95 and $20.00 as considerably greater than $0.05, and this is reflected in their purchasing behavior. Hence, prices with ending numbers distant from 0.95 or 0.99 will have relatively high loss values associated with them.

Information Presented to the User

Figure 2:
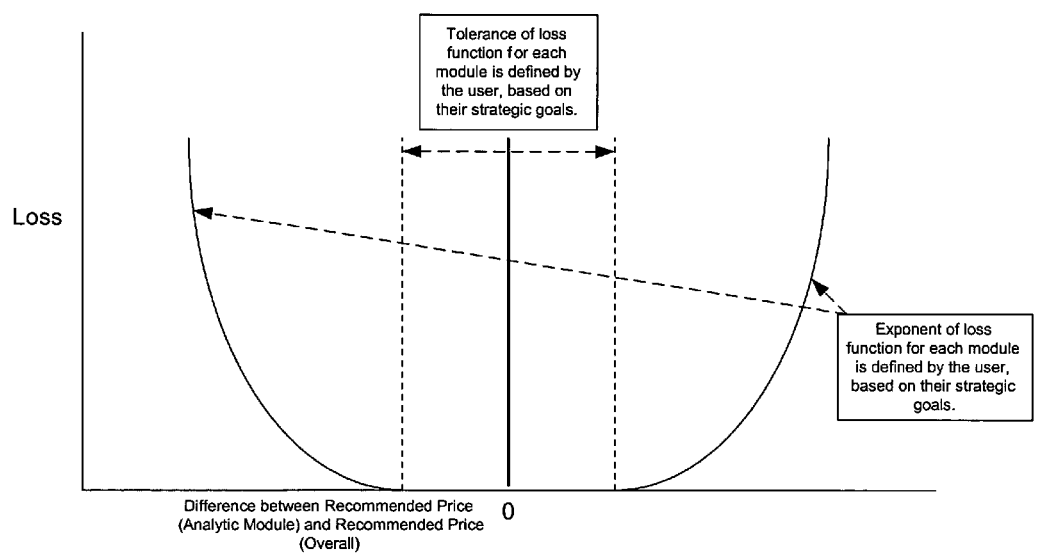
FIG. 2 is an illustration of a loss function useful for an understanding of the invention

A Category Review Screen presented to the user by the system is seen in FIG. 2. This screen presents summary information on categories to help retailers make strategic decisions at the category level. This screen presents information such as; revenue and profit broken down by category, revenue contribution and profit contribution, and unit movement by category for use in reviewing category performance, as well as overall store performance.

This screen will also help user-retailers identify problem categories that may need more attention. The screen displays revenue contribution as well as profit contribution, which when compared with each other can reveal powerful results. User-retailers can identify underperforming categories, review their use of inventory and shelf space, and identify sales trends in their stores across departments, categories, or subcategories.

Figure 3:
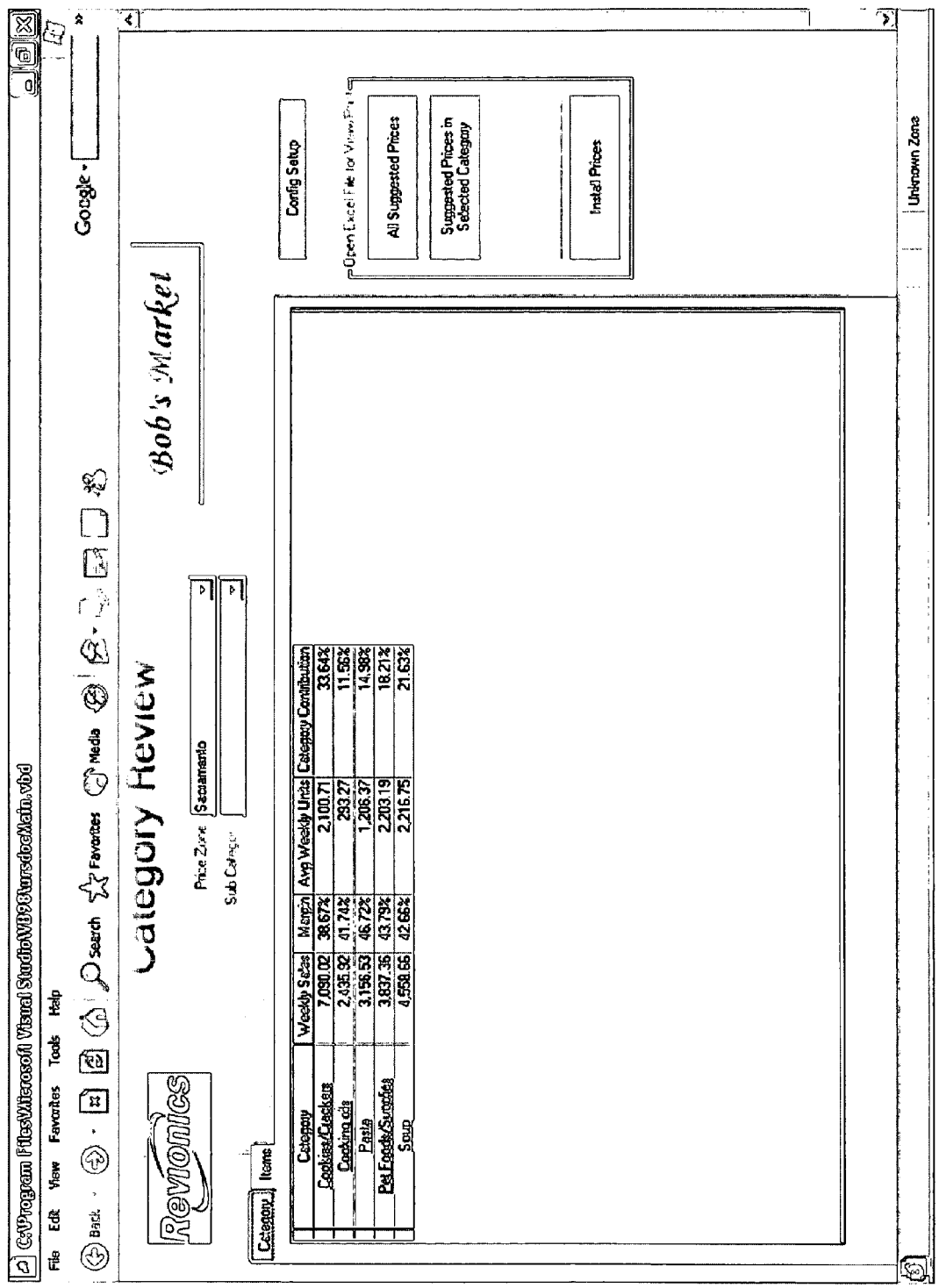
FIG. 3 is an illustration of a Category Review Screen useful in the system.

To analyze a specific category, the user-retailer can double click on the desired category and all products in that category will be displayed on a Category Detail Screen, which follows. A Category Detail Screen is provided as seen in FIG. 3 for use by the user-retailer's pricing analyst to review the recommended prices and associated data. Using this screen, the user-retailer can track all the summary data for all products in a given category or subcategory. By clicking on an individual product on the Category Detail Screen, the user can move to the Product Detail Screen and access the detail information for one specific product.

The data on the screen can be filtered and sorted. If the user-retailer wishes to only see items that have had a price change since the last review, only those items will be presented. Or, if the user-retailer only wants to review items in which the system is recommending a price change, only those can be viewed. The data can be sorted by any of the columns. User-retailers may drill down for information about any given product by simply clicking on an individual item. This will bring up the Product Detail Screen.

Figure 4:
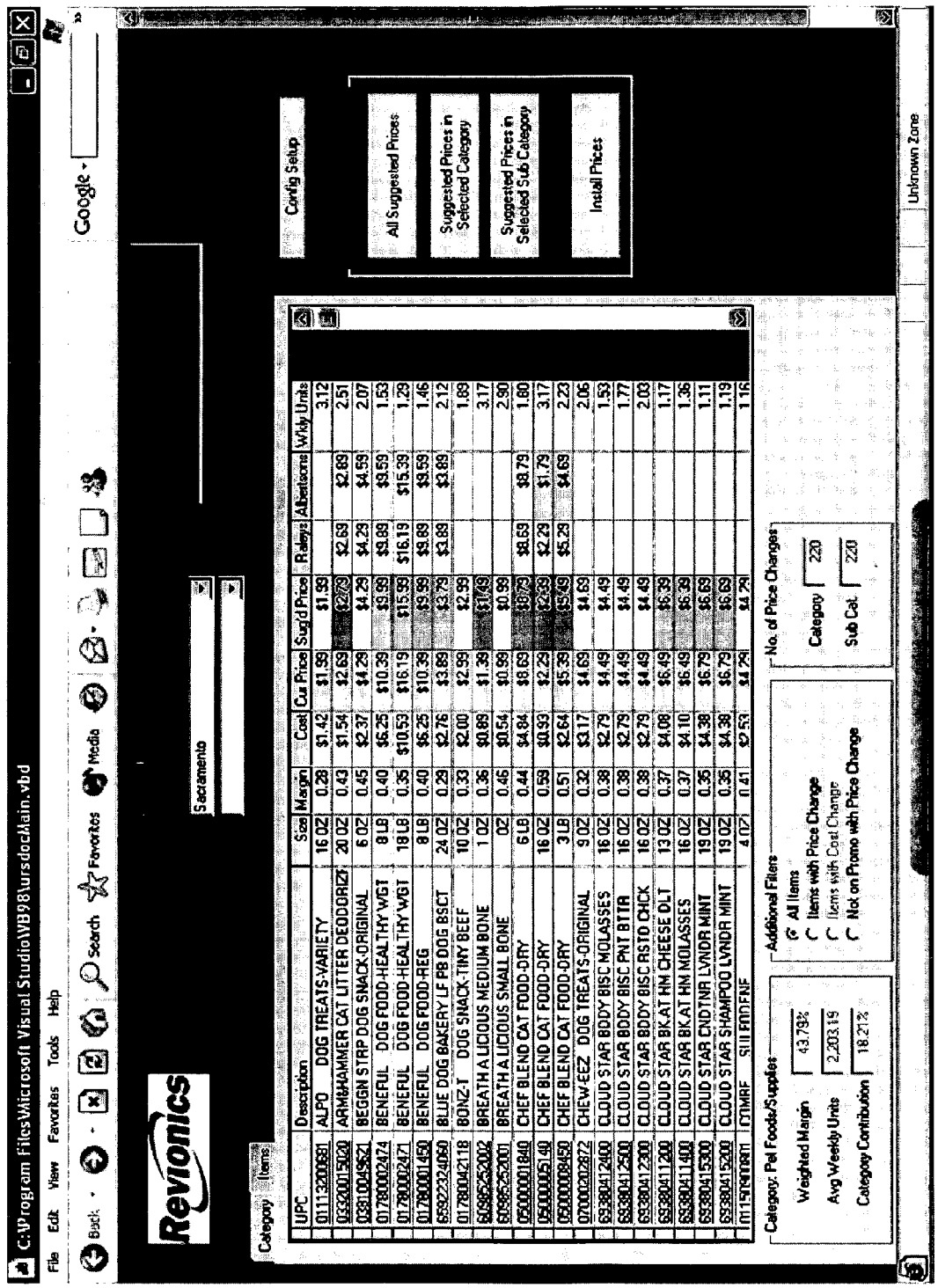
FIG. 4 is an illustration of a Category Detail Screen useful in the system.

The Product Detail Screen, an example of which is seen in FIG. 4, shows detailed information on a specific item. If the user-retailer wishes to further investigate why a price change is being recommended, they can view this screen. The Product Detail Screen can show sales history, price-per-unit ratios within a product family, private label gap with associated products, and more. In addition, the detail screen can also show the prices derived from the individual analytical components, providing the user-retailer with insight into the large number of analytical functions performed by the system, and the impact of each on the overall recommended price.

The relative importance, or weighting, of the analytics modules can be set by the user of the software. Additionally, the user may elect to lock a product price—that is, elect not to change a product's price for competitive or other reasons—and omit that particular product from the analysis process.

If the user-retailer's analyst wishes to view detailed information on a product, they can double click on the item and bring up the Product Detail Screen.

DETAILED DESCRIPTION

The overall Market-Based Price Optimization System (MBOS), described generally above will now be described in more detail with reference to the flow diagram of FIG. 1, which is an indication of process flow.

The MBOS utilizes inputs from several of its modules to generate recommendations for the regular (non-promoted) prices on a subcategory-by subcategory basis. Each module recommends prices individually which are reconciled to determine the prices recommended to the user-retailer. This can be presented via the Category Detail Screen described previously with respect to FIG. 3. The first three modules (Baseline Price Recommendation Module 10, Promotional Check Module 20 and Volume-Margin Analysis Module 30) are driven by an analysis of recent sales, price, and promotion data and are recalibrated on a bi-monthly or quarterly basis. The remaining modules (the Competitive Price Check Module 40, the Brand Equity Check Module 50, the Category Margin Check Module 60, the Price Unit Check Module 70 and the Price Ending Check Module 80, are calibrated on a weekly basis, or otherwise, to correspond with a typical user-retailer's pricing cycle and are used as a basis for refining price adjustments that periodic basis.

Each module generates price recommendations independently. For each specific module except the Price Ending Check Module 80, a measure is developed that associates a penalty or loss with deviations between a potential final price recommendation by the overall system and the price recommended by the specific module. These loss functions reflect the relative importance and reliability of each module in generating profitable and consistent prices. The final price recommended by the MBOS 1 is the price that minimizes the sum of the losses from all of the modules, as shown in Table 1, below.

TABLE 1

Loss Minimization Across all Modules

| Module | Recommended Price | Loss Exp | Tolerance | Low Boundary | High Boundary | Loss |
|---|---|---|---|---|---|---|
| Baseline-Demand | $3.91 | 1.1 | 5% | $3.71 | $4.11 | 10.460258 |
| Sales Promotion | $3.88 | 1.025 | 3% | $3.78 | $3.98 | 22.992653 |
| Volume Margin | $3.99 | 1.1 | 10% | $3.59 | $4.39 | 0 |
| Competitor Price | $4.29 | 1.05 | 3% | $4.16 | $4.42 | 0 |
| Brand Equity | $4.08 | 1.25 | 5% | $3.88 | $4.28 | 0 |
| Category Margin | $4.49 | 1.05 | 2% | $4.40 | $4.58 | 24.477347 |
| Price Per Unit | $4.09 | 1.075 | 5% | $3.89 | $4.29 | 0 |
| Price Endings | $4.19 | 1.6 | 0% | $4.19 | $4.19 | 0 |
| Overall | $4.19 | | | | | 57.930258 |

The weights, or relative importance, assigned to each module are determined by combining the user-retailer's objectives for the category, such as profit center or traffic builder (which may vary across categories) with the user-retailer's overarching goals for a store, zone, or chain. These values are not determined empirically, but rather by the user of the software.

An example of the determination of loss for each individual recommendation by each analytic module, and the adjustment of price recommendations to minimize the sum of losses from all modules follows.

Loss can be calculated as follows:

For each analytics module in MBOS, there is an optimized recommended price. The loss function for each module is calculated via linear programming as $$\text{Loss} = (|\text{Price}(\text{recommended}[\text{overall}]) - \text{Price}(\text{recommended}[\text{module}])| - \text{Tolerance})^L \{\text{Min}\, 0\}$$

where

Price (recommended[overall]) is the price based on the weighted average of all modules, Price (recommended[module]) is the recommended price from one specific MBOS analytic module, Tolerance is the acceptable distance between the two prices (defined by the user), L is the loss exponent, adjustable within the software based on the preference of the user-retailer, and {Min 0} means that loss cannot be below zero. (It is a measure of stress within the system; the amplitude of the number (its absolute value) is what is important, and IS always positive.)

Figure 6:
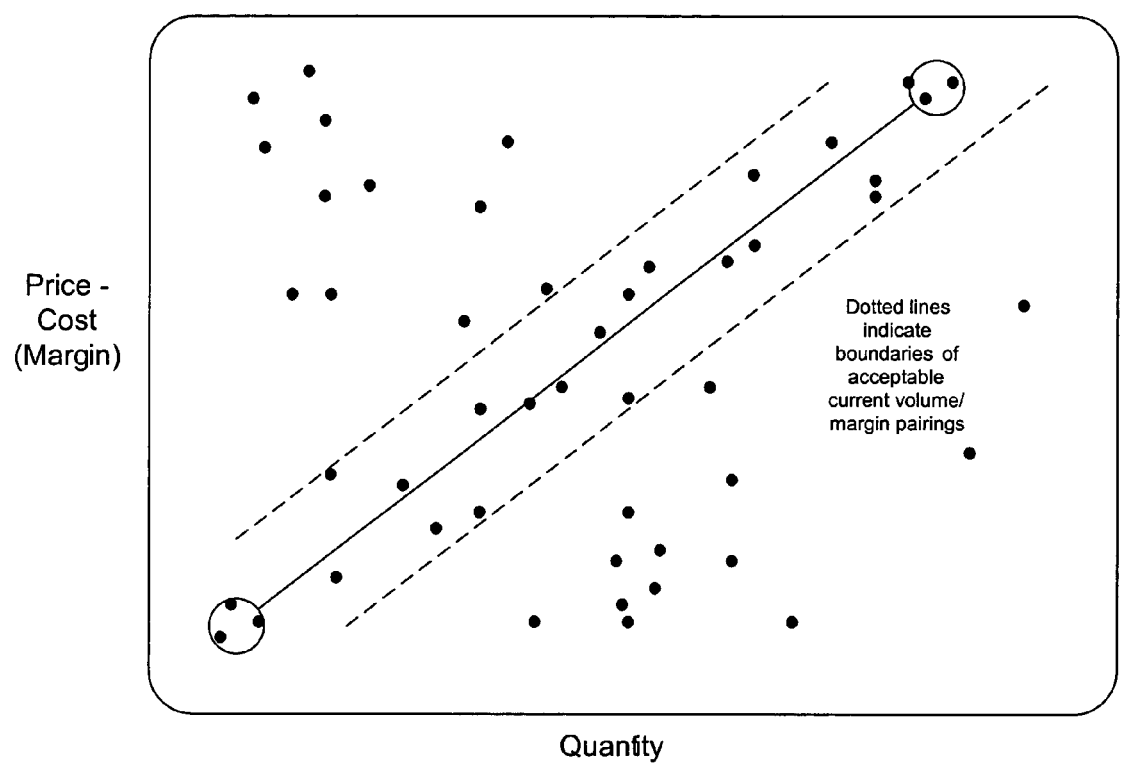
FIG. 6 is an illustration of a volume margin analysis graph, with margin as the ordinate and sales volume as the abscissa, useful for an understanding of the invention.

This is seen in the loss function graph of FIG. 6. A high value for L for a given analytic module means that if the overall recommended price is distant from the recommended price generated by that individual module, and outside the acceptable tolerance range, there will be a high loss. Given the specific nature of retailing, users may choose different loss exponents for different subcategories. For example, if a user-retailer is in close proximity to a competitor, they may choose a very high loss exponent for the Competitor Price Module 40. If they do this, loss will become very high very quickly if a product's price is outside the defined tolerance. The higher the loss exponent, the more quickly the loss escalates if the overall recommended price is far from the price recommended by the individual analytic module. The user has control of these exponents down to the subcategory level, giving them significant control over the final recommendations of the MBOS.

The final recommended price from MBOS will be determined by minimizing the total loss function values for a given product. Minimization can be performed via well-known linear programming, a standard mathematical technique, not unlike regression, identified elsewhere in this patent.

The following is a more detailed description on of the analytics modules and their operation. The analysis to recommend changes based the first three steps of the process below can be conducted on a bimonthly or quarterly basis. This frequency will make it possible to statistically estimate the impacts of the price changes on sales volume, which will yield measures of price sensitivity.

A. Baseline-Demand Module 10: The first step in the process is to determine if any price-sensitivity baselines exist and, if so, as at 11, implement price changes that incorporate these baselines. This is performed in the Baseline-Demand Module 10 of FIG. 1. Baselines are derived from a meta-analysis of demand estimates from comparable retailers or, if sufficient price variability exists, from recent historical sales data provided by the user-retailer. An example of price sensitivity calculation using historical sales data is seen in Table 2.

TABLE 2

Example of Price Sensitivity Calculation using Historical Sales Data

| Product | Price | Quantity | ΔP | ΔQ | ΔQ/ΔP |
|---|---|---|---|---|---|
| Coke, 2 Liter | $2.49 | 63 | 25% | 35% | 1.40 |
| | $1.99 | 97 | | | |
| Hz Ketchup, 42 oz | $2.99 | 91 | 14% | 7% | 0.49 |
| | $3.49 | 85 | | | |

In the example in Table 2, Coke sales dropped significantly when the price was increased, where Heinz Ketchup sales did not. Coke would be considered a product with significant price sensitivity, where Heinz Ketchup would be considered price insensitive. The threshold values for whether or not a product is considered price sensitive can be determined by the user at the subcategory level.

Baselines may not exist, as at 12, for example when entering a new retail market, in which case this module 10 is skipped until demand can be estimated more reliably. After price changes have been implemented in the category, the price variation allows demand estimation utilizing the Market Based Optimization System. Using these estimates profit-maximizing prices are computed for the category, which are then used as the basis for price recommendations subject to constraints that price changes will be restricted to ranges in which the demand estimates are deemed to be reliable.

B. Promotional Frequency Check Module 20: The Promotional Frequency Check Module 20 checks to determine whether a brand has been frequently price-promoted in the past. If the price has been frequently promoted in the past as at 21, the regular price of the product is increased. If not, as at 22, the Volume Margin Analysis Module 30 is put into operation. Raising the price of heavily promoted products will allow greater margins from a given price discount or a greater perceived discount with the same post-promotion price. The magnitude of the price increase will be proportional to a measure of promotional depth and frequency. For example, if a product is promoted every month at fifty percent (50%) off, the price increase will be greater than if the product is promoted one month out of six at thirty percent (30%) off. For products that are not regularly promoted, this adjustment can be bypassed if desired. All parameters of the promotional frequency analytics can be determined by the end user. The assessment of appropriate products and price adjustments can be made as follows:

If PRODUCT is promoted more frequently than N times in X weeks, then PRICE(PRODUCT) is increased by S percent. N, X, and S are all determined by the user of the software.

C. Volume-Margin Analysis Module 30: The objective of the Volume-Margin Analysis Module 30 is to improve category profitability by adjusting prices in a way that improves average unit contribution in the category. Prices are increased for high volume, low margin products and reduced for low volume, high margin products. The goal is to either induce switching to higher margin products, or increase the profitability of high volume products that have lower margins.

This module is based on the assumption that ideally, there should be a positive relationship between profitability and sales volume. The user-retailer would prefer to sell more products with a high profit margin, and fewer products with a low profit margin in most cases.

Volume-Margin Analysis takes place as follows, as seen with respect to FIG. 6:

Total movement for each product in a subcategory is plotted (scatter graph—Y Axis) against Margin Dollars (Price-Cost) for each SKU. The encircled points on the figure are merely illustrations of end points.

A "Target Line" is established as follows:

Line slope=(average($Q$(Top 10% SKUs by $Q$))-average($Q$(Bottom 10% SKUs by $Q$)) divided by (average(($P$-$C$)(Top 10% SKUs by ($P$-$C$)))-average(($P$-$C$)(Bottom 10% SKUs by ($P$-$C$))))

Line intercept=Min P-C, Min Q

In this algorithm, Price is absolute price; it is not price per unit.

Once the target line is established, it is used as the center of the target range for the Volume Margin Analysis module. The target range is defined as the target line+/−side(P-C)*(K)

where P is price, C is cost, and K a constant identified by the user to define an acceptable level of tolerance for volume/margin variance.

Products with a price/volume pairing outside of the target range will have their prices adjusted accordingly—reduced if volume is low but markup is high, and increased if volume is high but markup is low. The amount of the price change is a percentage determined by the software user.

In summary, data points indicate products within a subcategory, with the quantity sold graphed against the margin for that particular product. No price adjustment is made on those products within the acceptable band bounded by the dotted lines as at 31 in FIG. 1; this area is defined in the algorithm above. Products outside that area, as at 32 in FIG. 1, will have a price adjustment made to move them closer to the centerline.

(i) If a large fraction of a category's sales are generated by low margin products as at 33 of FIG. 1, those prices will be increased. If a large fraction of a category's sales are generated by high margin products as at 34 in FIG. 1, the price will be reduced. This is a very powerful process. By reducing the price on the highest margin items in a subcategory, one can switch consumers to those products and away from less profitable options that may have large sales volumes. This adjustment is based on an expectation that consumers will either continue purchasing or switch to higher margin alternatives. An exception is assigned to those products that the user-retailer has executed a "price lock" on, usually because those products are dedicated traffic builders, which the user-retailer believes must be priced low to maintain a low price image.

(ii) The magnitude of price changes depends on product category or subcategory and user objectives. The parameter value that determines the magnitude of the price changes is adjusted over time based on historical data within the category. It is a simple percent value, used as a multiplier against current price.

The remaining steps in the process, described below, can be executed on a weekly basis or when there is a change in market conditions, such as changes in unit wholesale cost, or changes in competitor price. The first of these modules, the Competitor Price Module 40, operates independently of the other modules. Competitor Price analytics do not depend on sales history or on information from other modules within MBOS. Competitor Price analytics consider only the prices charged for a particular product at user-retailer-identified competitors. The remaining modules (Brand Equity Module 50, Category Margin Check Module 60, Price Per Unit Check Module 70 and Price Ending Check Module 80) utilize the recommendations of the preceding modules and adjust them to improve internal consistency of prices within the category. Price changes that are more frequent than the bi-monthly or quarterly recalibrations of the above modules occur if: 1) competitive prices change resulting in changes in prices from the Competitor Price Module, or 2) unit wholesale costs change, prompting changes in the recommendations from the Category Margin and Price per Unit Modules.

D. Competitor Price Module 40: This module utilizes prices obtained from competitive price shops and compares potential prices with those charged by competitors. The recommended prices are based on the stated overall strategy of the user-retailer (such as emphasizing price, service, selection, or value), and the role of the category in the execution of the strategy.

(i) Ideal prices relative to competitors will be obtained from the user based on specified objectives and retail strategy. Examples of objectives may be a specified percentage of a competitor's price or being within an acceptable percentage range relative to one or more competitors such as at 41. These criteria may vary across categories. If the price is higher than an acceptable difference as at 42, the recommendation is to lower the price. If it is lower than acceptable difference as at 43, then the recommendation is to raise the price.

For example, consider an individual product—24-ounce Heinz Ketchup. To calculate the ideal price position for the user, the weight for each competitor is multiplied by his or her price, to create a weighted average, as illustrated in Table 3.

TABLE 3

Example of Creation of Weighted Average

| Competitor | Price | Weight | Price * Weight |
|---|---|---|---|
| Safeway | $1.79 | 40% | $.716 |
| Raley's | $1.89 | 30% | $.567 |
| Albertson's | $1.89 | 20% | $.378 |
| Nugget | $1.99 | 10% | $.199 |
| Sum | — | 100% | $1.86 |

Table 3 shows that the weighted average, based on user-identified importance of each competitor, is $1.86.

This value is multiplied by the Competitor Price Index, which is identified for each subcategory by the user. The Competitor Price Index is simply a number that indicates where the software user wants to price their goods relative to their competition. If the user wanted to price 5% above competitors for a given subcategory, they would set the Competitor Price Index at 1.05. To arrive at the recommended price for a given product, the weighted average price is multiplied by the Competitor Price Index. In this case, if the Competitor Price Index is 1.05, the resulting Competitor Price Module recommended price would be 1.05×$1.86, or $1.95.

(ii) A loss function, as described above, will be attached to deviations in prices from those charged by competitors according to both the desired price relative to competitors as well as the extent to which it falls within an acceptable range. The percentage variance that defines the acceptable range is determined by the software user. Losses associated with the latter criterion typically will receive greater weight. Price recommendations for the module are set to minimize the total loss from these two components.

E. Brand Equity Module 50: This module determines whether the proposed prices of various brands are within acceptable ranges relative to a reference brand in a subcategory. This ratio reflects the proportional price differential, or brand equity, each brand commands relative to a reference brand as measured by prices currently charged by competing retailers (including the user). This module adjusts prices to ensure consistency across sizes and product forms. When the product brand is a private label brand then this differential may be viewed as "the private label gap."

One of the product specific dimensions that retailers should monitor and optimize is the private label gap, or the amount a private label product is priced below a nationally branded product of similar size and usage. The size of the gap, which typically ranges from 20% to 40%, is highly debated among retailers. Private label gap targets are identified by subcategory, based on an ad hoc review of sales data by the user at the time of software installation. Private labels are used in the Brand Equity analytics module (which module is described subsequently in FIG. 1) as a part of a multiple regression. The system monitors these gaps, and identifies instances where these prices are not within user-specified ranges. When a private label product has a price which is too far away (as identified by the user above) from the national brand price, the software will recommend an incremental price change of N % of the current price, where N is a parameter established by the user. Other dimensions used in the analysis include price-per-unit ratios for product lines, and families of products that require identical pricing.

(i) Price per unit values are calculated for each brand and the ratio of the average price per unit of the chosen brand to the price per unit of the reference brand is computed. Prices per unit by brand are calculated via regression analysis using historical sales volume, and a flag for each different brand within a subcategory, as follows:

Price Per Unit=Intercept+Coefficient(Brand 1)+Coefficient(Brand 2) . . . +Coefficient(Brand N), where N is the number of brands in the subcategory where:

Intercept is the constant resulting from the regression analysis of the sales data.

Coefficient (Brand) is the price multiplier, determined by the regression analysis above, for the first brand in the subcategory.

Coefficient (Brand) is the price multiplier, determined by the regression analysis above, for the second brand in the subcategory; and Coefficient (Brand N) is the price multiplier, determined by the regression analysis above, for the last (Nth) brand in the subcategory.

A Price Per Unit is then calculated for each product, and a recommended price determined by multiplying the Price Per Unit by the pack size. If the recommended price varies from the current price by more than V % (where V is determined by the software user), the price is adjusted upward, as at 51 in FIG. 1, or downward, as at 52 in FIG. 1, by X %. (where X is determined by the software user). Prices that are consistent as defined by the user are recommended to have no price change, as at 53.

(ii) Price recommendations will be adjusted to minimize the total loss from this and the preceding modules, as described previously.

F. Category Margin Module 60: This module checks to determine if the prices recommended are consistent with the user-retailer's average margin objectives for the category or subcategory. In the absence of specific user objectives, current margins (perhaps with a slight increase depending on the category) are utilized.

The Category Margin Module 60 calculates a recommended price for a product in a subcategory based on a user-defined target margin. If subcategory margin (margin is calculated as (price-cost)/price) is below target margin, all products in the subcategory that are not explicitly excepted from optimization via price lock are ranked (descending) by total volume. From that list, the top item's price is adjusted upwards by N % (as defined by the user) and then margin recalculated. If the price change increases total loss for the product, the price change is discarded, and the process is repeated on the next product down on the list. This is seen generally at 61 in FIG. 1. If the subcategory margin is above the target margin, the item's price is adjusted downwards as seen at 62. Margins that are in line are not adjusted, as seen at 63.

The number of price recommendations created by this module is subject to a maximum as defined by the user.
(i) Initially utilizing current quantities sold, an estimated average category margin with the new prices is calculated. An example is seen in Table 4.

TABLE 4

Example of average category margin calculation

| Product | Price | Cost | Qty | Margin |
|---|---|---|---|---|
| Oreo Cookies 32 Oz | 4.99 | 2.99 | 24 | 40% |
| Pepperidge Farm Milan Cookies | 3.99 | 2.99 | 17 | 25% |
| Average for Category | — | — | 41 | 34.7% |

In this example of a two-product subcategory of cookies, the weighted average margin for the subcategory is calculated by taking the margin (price-cost) for all products sold, and dividing by total sales for the subcategory. In the example provided, that's (($2.00)*24)+(($1.00)*17))=$65, divided by (24*$4.99)+(17*$3.99)=187.59, so the average category margin is 34.7%.

(ii) A loss function is assigned to average category margins that fall short of the target value.
(iii) Price recommendations are adjusted to minimize the total loss from this and the preceding modules.

G. Price per Unit Module 70: This module evaluates the consistency of price per unit and markup per unit relationships with proposed prices. It is expected that a product's price per unit should be lower as the number of units (size) increases.
(i) A typical average relationship between unit size and both price and margin per unit is calculated using regression or means across brands.
(ii) A loss function is assigned to prices that are inconsistent with a monotonically decreasing price and profit per unit relationship. If available data indicates significant deviations from industry or category baselines, loss for this module is increased. The loss function places a greater weight on the markup per unit than on price per unit. Also, a greater loss weight is placed on prices that violate a monotonic relationship than on prices demonstrating deviations from industry or category norms.

For each increasing SIZE of the same PRODUCT, a price per unit is calculated as PRICE/NUMBER OF UNITS. For example, a 14 oz bottle of Heinz Ketchup that costs $1.40 would have a price per unit of $1.40/14 oz, or $0.10/oz. If that bottle of Ketchup has a cost of $ 0.70 per bottle, the margin per unit would be ($1.40-$0.70)/14 oz, or $0.05/oz.

If the PRICE PER UNIT is higher for a larger size container of a PRODUCT, the software recommends a higher price for the smallest size container, so that the smallest container has the highest PRICE PER UNIT for that PRODUCT. That price is set by setting the price per unit to N % above the price per unit for the next size container up, and multiplying by the size of the container. The specific value of N is determined by the user.
(iii) Price recommendations will be adjusted to minimize the total loss from the first five steps.

H. Price Endings Module 80: The final module 80 examines the endings of the price recommendations from the preceding modules and suggests price adjustments that have acceptable price endings. This is done through the use of a set of lookup tables, depending on the price of the product.

If the product costs less than $0.50, no adjustment is made to the ending digits.

If the product costs between $0.50 and $1.00, price ending adjustments are made as seen in Table 5.

TABLE 5

Price Endings Adjustments for Prices Ending Between $.51 and $1.00

| Price Ending Value (Last Two Digits) | Price Ending Adjustment (Add) |
|---|---|
| 50 | 0 |
| 51 | 0 |
| 52 | 0 |
| 53 | 0 |
| 54 | 0 |
| 55 | 0 |
| 56 | 0 |
| 57 | 0 |
| 58 | 0.01 |
| 59 | 0 |
| 60 | −0.01 |
| 61 | 0.04 |
| 62 | 0.03 |
| 63 | 0.02 |
| 64 | 0.01 |
| 65 | 0 |
| 66 | 0.03 |
| 67 | 0.02 |
| 68 | 0.01 |
| 69 | 0 |
| 70 | −0.01 |
| 71 | 0.04 |
| 72 | 0.03 |
| 73 | 0.02 |
| 74 | 0.01 |
| 75 | 0 |
| 76 | 0.03 |
| 77 | 0.02 |
| 78 | 0.01 |
| 79 | 0 |
| 80 | −0.01 |
| 81 | −0.02 |
| 82 | 0.07 |
| 83 | 0.06 |
| 84 | 0.05 |
| 85 | 0.04 |
| 86 | 0.03 |
| 87 | 0.02 |
| 88 | 0.01 |
| 89 | 0 |
| 90 | −0.01 |
| 91 | 0.07 |
| 92 | 0.06 |
| 93 | 0.06 |
| 94 | 0.05 |
| 95 | 0.04 |
| 96 | 0.03 |
| 97 | 0.02 |
| 98 | 0.01 |
| 99 | 0 |

If the recommended price above $1.00, price ending adjustments are made as seen in Table 6.

TABLE 6

Price Ending Adjustments for Price Endings Between $1.00 and $1.99

| Price Ending Value (Last Two Digits) | Price Ending Adjustment (Add) |
|---|---|
| 01 | −0.02 |
| 02 | −0.03 |

TABLE 6-continued

Price Ending Adjustments for Price Endings Between $1.00 and $1.99

| Price Ending Value (Last Two Digits) | Price Ending Adjustment (Add) |
|---|---|
| 03 | −0.04 |
| 04 | 0.05 |
| 05 | 0.04 |
| 06 | 0.03 |
| 07 | 0.02 |
| 08 | 0.01 |
| 09 | 0 |
| 10 | 0.09 |
| 11 | 0.08 |
| 12 | 0.07 |
| 13 | 0.06 |
| 14 | 0.05 |
| 15 | 0.04 |
| 16 | 0.03 |
| 17 | 0.02 |
| 18 | 0.01 |
| 19 | 0 |
| 20 | −0.01 |
| 21 | 0.08 |
| 22 | 0.07 |
| 23 | 0.06 |
| 24 | 0.05 |
| 25 | 0.04 |
| 26 | 0.03 |
| 27 | 0.02 |
| 28 | 0.01 |
| 29 | 0 |
| 30 | −0.01 |
| 31 | −0.02 |
| 32 | −0.03 |
| 33 | 0.06 |
| 34 | 0.05 |
| 35 | 0.04 |
| 36 | 0.03 |
| 37 | 0.02 |
| 38 | 0.01 |
| 39 | 0 |
| 40 | 0.09 |
| 41 | 0.08 |
| 42 | 0.07 |
| 43 | 0.06 |
| 44 | 0.05 |
| 45 | 0.04 |
| 46 | 0.03 |
| 47 | 0.02 |
| 48 | 0.01 |
| 49 | 0 |
| 50 | −0.01 |
| 51 | −0.02 |
| 52 | −0.03 |
| 53 | −0.04 |
| 54 | −0.05 |
| 55 | −0.06 |
| 56 | −0.07 |
| 57 | 0.02 |
| 58 | 0.01 |
| 59 | 0 |
| 60 | −0.01 |
| 61 | 0.08 |
| 62 | 0.07 |
| 63 | 0.06 |
| 64 | 0.05 |
| 65 | 0.04 |
| 66 | 0.03 |
| 67 | 0.02 |
| 68 | 0.01 |
| 69 | 0 |
| 70 | 0.09 |
| 71 | 0.08 |
| 72 | 0.07 |
| 73 | 0.06 |
| 74 | 0.05 |
| 75 | 0.04 |
| 76 | 0.03 |
| 77 | 0.02 |
| 78 | 0.01 |
| 79 | 0 |
| 80 | −0.01 |
| 81 | −0.02 |
| 82 | −0.03 |
| 83 | 0.06 |
| 84 | 0.05 |
| 85 | 0.04 |
| 86 | 0.03 |
| 87 | 0.02 |
| 88 | 0.01 |
| 89 | 0 |
| 90 | −0.01 |
| 91 | 0.08 |
| 92 | 0.07 |
| 93 | 0.06 |
| 94 | 0.05 |
| 95 | 0.04 |
| 96 | 0.03 |
| 97 | 0.02 |
| 98 | 0.01 |
| 99 | 0 |

The final resulting price recommendations will be adjusted to minimize the total loss from all modules.

While the foregoing has been with reference to particular embodiments of the invention, it will be appreciated by those skilled in the art that changes in these embodiments may be made without departing from the principles and spirit of the invention, the scope of which is defined by the appended claims.

We claim:

1. In an electronic price optimization system comprising at least one computer processor and computer storage, a method for recommending to a user price changes for products of differing brands, the method comprising:
   using a computer processor for:
   determining whether any price-sensitivity baselines exist; and implementing, when any of said price-sensitivity baselines exist, price changes that incorporate said price-sensitivity baselines;
   determining whether a brand of product has been frequently price-promoted in the past and, if so, recommending that the regular price of the product be increased;
   identifying possible outlier products from market norms based on deviations of a user's sales from said market norms and recommending the price of said outlier products based on said deviations;
   comparing the prices of a category of products to prices charged for said category of products by retailers competing with said user and recommending prices based on an overall strategy of said user;
   determining whether the prices of products of specific brands are within acceptable ranges relative to a reference brand;
   comparing the projected average margin from a category of products with objectives set by said user, and calculating a recommended price for said product based on said objectives; and
   calculating across brands of a product a typical average relationship between unit sizes of said product and both price and margin per unit of said product.

2. The method of claim 1 wherein said calculating said typical average relationship uses a mathematical model that includes an intercept, a price weight and a flag for each brand of product and, using software to loop through each brand of the product, setting the appropriate flag to one and all others to zero, depending on the brand, to determine the individual weight of each brand.

3. One or more non-transitory processor readable storage devices having processor readable code embodied thereon for programming the one or more processors to perform a method for recommending to a user price changes for products of different brands, said products having a regular price, said method comprising:

determining whether any price-sensitivity baselines exist; and implementing, when any of said price-sensitivity baselines exist, price changes that incorporate said price-sensitivity baselines;

determining whether a brand of product has been frequently price-promoted in the past and, if so, recommending that the regular price of the product be increased;

identifying possible outlier products from market norms based on deviations of a user's sales from said market norms and adjusting the price of said outlier products based on said deviations;

comparing the prices of a category of products to prices charged for said category of products by retailers competing with said user and recommending prices based on an overall strategy of said user;

determining whether the prices of products of specific brands are within acceptable ranges relative to a reference brand;

comparing the projected average margin from a category of products with objectives set by said user, and calculating a recommended price for said product based on said objectives; and calculating across brands of a product a typical average relationship between unit sizes of said product and both price and margin per unit of said product.

4. The one or more non-transitory processor readable storage devices of claim 3 wherein calculating said typical average relationship uses a mathematical model that includes an intercept, a price weight, and an appropriate flag for each brand of product and, using software to loop through each brand of the product, setting said appropriate flag to one and all others to zero, depending on the brand, to determine the individual weight of each brand.

* * * * *